United States Patent
Park et al.

(10) Patent No.: US 10,864,899 B2
(45) Date of Patent: Dec. 15, 2020

(54) SYSTEM AND METHOD FOR PARKING CONTROL OF VEHICLE

(71) Applicants: Hyundai Motor Company, Seoul (KR); Kia Motors Corporation, Seoul (KR)

(72) Inventors: Joon Young Park, Gyeonggi-do (KR); Chang Hyun Lee, Seoul (KR); Yang Rae Cho, Gyeonggi-do (KR); Hwi Bong Chang, Gyeonggi-do (KR); Seong Uk Bae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 167 days.

(21) Appl. No.: 16/152,338

(22) Filed: Oct. 4, 2018

(65) Prior Publication Data

US 2019/0168730 A1  Jun. 6, 2019

(30) Foreign Application Priority Data

Dec. 5, 2017 (KR) .......................... 10-2017-0165915

(51) Int. Cl.
*B60T 17/18* (2006.01)
*B60T 8/00* (2006.01)
(Continued)

(52) U.S. Cl.
CPC .............. *B60T 17/18* (2013.01); *B60K 35/00* (2013.01); *B60T 7/12* (2013.01); *B60T 7/22* (2013.01);
(Continued)

(58) Field of Classification Search
CPC .......... B60T 8/17; B60T 8/00; B60T 2260/04; B60T 2201/10; G07C 5/0808;
(Continued)

(56) References Cited

U.S. PATENT DOCUMENTS

| 4,892,014 A | 1/1990 | Morell et al. |
| 5,630,489 A * | 5/1997 | Bebernes ................ B60T 13/22 192/219.4 |

(Continued)

FOREIGN PATENT DOCUMENTS

| EP | 1845495 A1 | 10/2007 |
| FR | 2981900 A1 | 5/2013 |

(Continued)

*Primary Examiner* — Rami Khatib
(74) *Attorney, Agent, or Firm* — Mintz Levin Cohn Ferris Glovsky and Popeo, P.C.; Peter F. Corless (57) ABSTRACT

A system for parking control of a vehicle in which a transmission parking configuration is omitted is provided. The system includes a shift by wire device that requests a parking control of the vehicle when a parking stage is input by an operation of a driver. An electronic parking brake operates a brake installed on a drive wheel via a relay which is connected to be in a parking brake state when the electronic parking brake receives the parking control request from the shift by wire device. The shift by wire device switches the relay to directly operate the brake to be in the parking brake state when the shift by wire device receives a failure event, which indicates that a normal operation of the electronic parking brake is impossible, from the electronic parking brake.

16 Claims, 7 Drawing Sheets

(51) Int. Cl.
  *B60T 8/17* (2006.01)
  *B60T 7/22* (2006.01)
  *B60K 35/00* (2006.01)
  *B60T 7/12* (2006.01)
  *F16H 61/32* (2006.01)
  *F16H 63/34* (2006.01)
  *F16H 63/42* (2006.01)
  *F16H 63/48* (2006.01)
  *G07C 5/08* (2006.01)
  *B60T 7/02* (2006.01)
  *B60T 13/74* (2006.01)
  *F16H 61/02* (2006.01)

(52) U.S. Cl.
  CPC  *B60T 8/00* (2013.01); *B60T 8/17* (2013.01); *F16H 61/32* (2013.01); *F16H 63/3458* (2013.01); *F16H 63/42* (2013.01); *F16H 63/48* (2013.01); *G07C 5/0808* (2013.01); *B60T 7/02* (2013.01); *B60T 13/741* (2013.01); *B60T 2201/10* (2013.01); *B60T 2260/04* (2013.01); *B60T 2270/402* (2013.01); *F16H 61/0204* (2013.01); *F16H 2063/423* (2013.01); *F16H 2312/12* (2013.01)

(58) Field of Classification Search
  CPC ...... F16H 63/48; F16H 61/32; F16H 2312/12; F16H 2063/423; F16H 61/0204; F16H 63/486

See application file for complete search history.

(56) References Cited

U.S. PATENT DOCUMENTS

| | | | |
|---|---|---|---|
| 8,634,995 B2* | 1/2014 | Deurloo | F16H 61/16 |
| | | | 192/219.4 |
| 9,145,126 B2* | 9/2015 | Kinoshita | B60W 10/11 |
| 2010/0294602 A1* | 11/2010 | Gustafsson | B60T 13/746 |
| | | | 188/158 |
| 2011/0112732 A1* | 5/2011 | Ueno | F16H 63/483 |
| | | | 701/51 |
| 2013/0252784 A1* | 9/2013 | Kinoshita | B60W 10/184 |
| | | | 477/92 |
| 2015/0344004 A1* | 12/2015 | Al-Regib | B60W 30/1819 |
| | | | 701/51 |
| 2018/0093669 A1* | 4/2018 | Khafagy | B60W 10/06 |

FOREIGN PATENT DOCUMENTS

| | | |
|---|---|---|
| KR | 10-0250300 B1 | 4/2000 |
| KR | 10-0866469 B1 | 10/2008 |

\* cited by examiner

| Item | Cost (one thousand South Korean Won) | Weight(kg) |
|---|---|---|
| Electric motor and controller outside of SBW | −105 | −0.8 |
| Transmission parking device | −22 | −1.5 |
| EPB drive structure of SBW system (Fail-safe control) | +20 | - |

SYSTEM AND METHOD FOR PARKING CONTROL OF VEHICLE

CROSS-REFERENCE TO RELATED APPLICATION

This application claims priority to and the benefit of Korean Patent Application No. 10-2017-0165915 filed on Dec. 5, 2017, the entire contents of which are incorporated herein by reference.

BACKGROUND

(a) Field of the Invention

The present invention relates to a system and a method for parking control of a vehicle, and more particularly, to a system and a method for parking control of a vehicle capable of replacing a parking brake of the vehicle transmission in the related art.

(b) Description of the Related Art

Generally, to perform parking, a driver performs an operation of a shift lever, an accelerator operation, a brake operation, and a steering wheel operation while being attentive to potential surrounding obstacles and a parking space for secure parking. The driver may repeatedly move the vehicle forward and backward to enter the vehicle into the parking space. When the parking space is small or a driving skill of the driver is low, the forward and backward movement may be frequent and parking of the vehicle may be more difficult.

The forward and backward movement is performed by an operation of the shift lever by the driver. In a case of an automatic transmission, shift stages are arranged in an order of a parking (P) stage, a reverse (R) stage, a neutral (N) stage, and a drive (D) stage which causes an inconvenience in that the R stage and the D stage are required to be moved up and down as much as two steps. Unlike a conventional mechanical transmission, an electronic transmission that is a shift by wire (SBW) device without a mechanical connection structure such as a cable between a transmission and a shift lever is being developed.

Further, the shift stage is selected electronically in the SBW device. There is no shock and vibration in the SBW device since there is no mechanical connection like the shift lever in the SBW device. There is also no restriction of shape of the SBW device. The SWB device transmits a driver's shift intention to a shift controller using an electric signal due to a simple operation of the driver. Thus, selection of the shift stage is performed more easily.

However, when the SBW device is applied to a vehicle, manufacturing cost and weight of the vehicle are inevitably increased and thus, sales competitiveness and fuel efficiency decrease. Therefore, there is a need for a solution to the cost and weight increase problem which is an obstacle in expanding the application of the SBW device to the vehicle.

The above information disclosed in this section is merely for enhancement of understanding of the background of the invention and therefore it may contain information that does not form the prior art that is already known in this country to a person of ordinary skill in the art.

SUMMARY

The present invention provides a system and a method for parking control of a vehicle that are capable of removing a transmission parking configuration and implementing a transmission parking function using cooperative control between an electronic transmission (e.g., a shift by wire (SBW) device or an SBW system) and an electronic parking brake (EPB).

An exemplary embodiment of the present invention provides the system for parking control of the vehicle in which the transmission parking configuration may be omitted that may include: a shift by wire device configured to request a parking control of the vehicle when a parking stage is input by an operation of a driver of the vehicle; and an electronic parking brake configured to operate a brake installed on a drive wheel via a relay which is connected to operate the brake to be in a parking brake state when the electronic parking brake receives the parking control request from the shift by wire device. The shift by wire device may be configured to switch the relay to directly operate the brake to be in the parking brake state when the shift by wire device receives a failure event, which indicates that a normal operation of the electronic parking brake is impossible, from the electronic parking brake.

The system may further include: a cluster configured to display information according to a shift operation of the shift by wire device to the driver; a central gateway configured to interconnect the shift by wire device, the electronic parking brake, and the cluster that communicate heterogeneous network; and a backup line that connects a communication between the shift by wire device and the electronic parking brake when the failure event occurs. The shift by wire device may include: a control system configured to electronically input a shift stage of a parking stage, a reverse stage, a neutral stage, a drive stage, or a neutral parking stage; and a shift by wire controller configured to perform a shift control based on the shift stage.

The electronic parking brake may include: an electronic parking brake switch configured to input a parking signal under a manual control of the driver or a predetermined stop condition of the vehicle; and an electronic parking brake controller configured to operate the brake using the relay to move the brake into the parking brake state when the parking signal is input. The shift by wire controller may be configured to request the electronic parking brake controller to perform a parking release control when any one of the reverse stage, the neutral stage, the drive stage, and the neutral parking other than the parking stage is received from the control system in the parking control state of the vehicle.

The electronic parking brake controller may be configured to transmit the failure event to the shift by wire controller when the electronic parking brake controller fails to perform the parking control or the parking release control according to a cooperative control request of the shift by wire controller. The electronic parking brake controller may be configured to determine that the normal operation of the electronic parking brake is impossible when a voltage difference of the relay driving the brake, which the electronic parking brake controller monitors via self-diagnosis, exceeds a predetermined range.

The relay may be configured to transmit a parking control command of the electronic parking brake to the brake at a normal time (e.g., when a failure event is not detected), and transmit a parking control command of the shift by wire device to the brake in an emergency which indicates that the normal operation of the electronic parking brake is impossible. The relay may include a first relay and a second relay that selectively connect the electronic parking brake and the shift by wire device to the brake during the parking control of the vehicle.

An exemplary embodiment of the present invention may provide a method for parking control of the vehicle in which the transmission parking configuration is omitted, including: requesting, by a shift by wire device, a parking control of the vehicle to an electronic parking brake when a parking stage is input by an operation of a driver of the vehicle; confirming, by the electronic parking brake, monitoring information of the electronic parking brake according to the parking control request to determine whether a normal operation of the electronic parking brake is possible; and switching, by the shift by wire device, a relay that is connected to directly operate a brake installed on a drive wheel to be in a parking brake state when the shift by wire device receives a failure event, which indicates that a normal operation of the electronic parking brake is impossible, from the electronic parking brake.

Additionally, the method may include adjusting, by the electronic parking brake, the brake, via the relay, to be in the parking brake state when the electronic parking brake determines that the normal operation of the electronic parking brake is possible. The switching of the relay may include operating, by the shift by wire device, a first motor on caliper and a second motor on caliper mounted on both drive wheels of the vehicle to be in the parking brake state via the first relay and the second relay that are switched to the shift by wire device when the failure event occurs.

The confirmation of the monitoring information may include determining, by an electronic parking brake controller of the electronic parking brake, that the normal operation of the electronic parking brake is impossible when a voltage difference of the relay driving the brake, which the electronic parking brake controller monitors via self-diagnosis, exceeds a predetermined range.

The method may further include requesting, by the shift by wire device, parking release to the electronic parking brake when a shift stage except the parking stage is input by an operation of the driver; confirming, by the electronic parking brake, monitoring information of the electronic parking brake based on the parking release request to determine whether a normal operation of the electronic parking brake is possible; adjusting, by the electronic parking brake, the brake, via the relay, to be in a parking brake release state when the electronic parking brake determines that the normal operation of the electronic parking brake is possible; and switching, by the shift by wire device, the relay to directly operate the brake to be in the parking brake release state when the shift by wire device receives a failure event, which indicates that a normal operation of the electronic parking brake is impossible, from the electronic parking brake. Additionally, the method may include: receiving, by the shift by wire device, the failure event from the electronic parking brake via a duplicated backup line.

Another exemplary embodiment of the present invention may provide the method for parking control of the vehicle in which the transmission parking configuration is omitted, including receiving, by an electronic parking brake, a signal of an electronic parking brake switch of the electronic parking brake input by a driver of the vehicle; confirming, by the electronic parking brake, monitoring information of the electronic parking brake based on the input signal of the electronic parking brake switch to determine whether a normal operation of the electronic parking brake is possible and determining a failure event as an event in response to determining that the normal operation of the electronic parking brake is impossible; transmitting, by the electronic parking brake, the failure event to a shift by wire device to request cooperative control; and switching, by the shift by wire device, a relay that is connected at an ordinary time to directly operate a brake installed on a drive wheel to be in a parking brake state when the shift by wire device receives a failure event from the electronic parking brake.

The exemplary embodiment of the present invention may perform safe transmission parking control using the cooperative control of the electronic transmission (SBW) and the electronic parking brake (EPB). The exemplary embodiment may reduce manufacturing cost and a weight of the vehicle by omitting the transmission parking configuration. Further, the exemplary embodiment may secure safe transmission parking control, and may secure customer competitiveness due to the manufacturing cost and weight reduction of the vehicle.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. Throughout the specification, the terms "-er", "-or" and "module" described in the specification mean units for processing at least one function and operation and can be implemented by hardware components or software components and combinations thereof.

Hereinafter, a system and a method for parking control of a vehicle according to an exemplary embodiment of the present invention will be described in detail with reference to the accompanying drawings.

Figure 1:
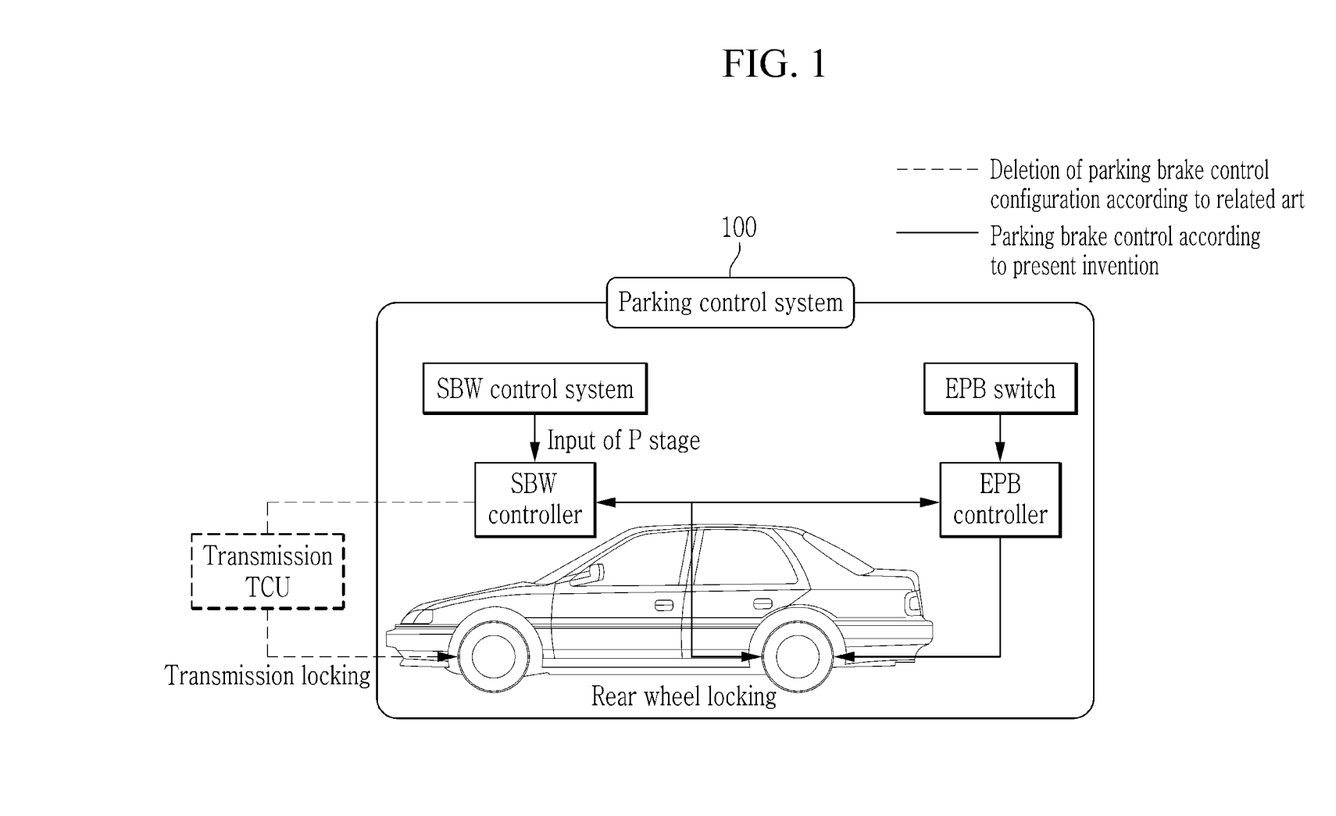
FIG. 1 is a conceptual diagram illustrating a system for parking control of a vehicle according to an exemplary embodiment of the present invention.

FIG. 1 is a conceptual diagram illustrating a system for parking control of a vehicle according to an exemplary embodiment of the present invention. Referring to FIG. 1, in a vehicle according to a related art, when a parking (P) stage is input in an electronic transmission, a transmission control unit (TCU) drives a motor to perform a parking function by operating a transmission parking mechanism. However, the system 100 for parking control of the vehicle according to the exemplary embodiment of the present invention may omit the transmission parking configuration according to the related art. A purpose of the present invention is to reduce manufacturing cost and weight of the vehicle by performing transmission parking control using cooperative control between the electronic transmission (e.g., a shift by wire (SBW) device or an SBW system) and an electronic parking brake (EPB).

The system 100 may be configured to execute parking of a rear wheel of the vehicle using an EPB controller when the P stage is input in the SBW device. Then, when a shift stage (e.g., a reverse (R) stage, a neutral (N) stage, or a drive (D) stage) other than the P stage is input in the SBW device, the system 100 may be configured to execute parking release of the rear wheel using the EPB controller.

Figure 2:
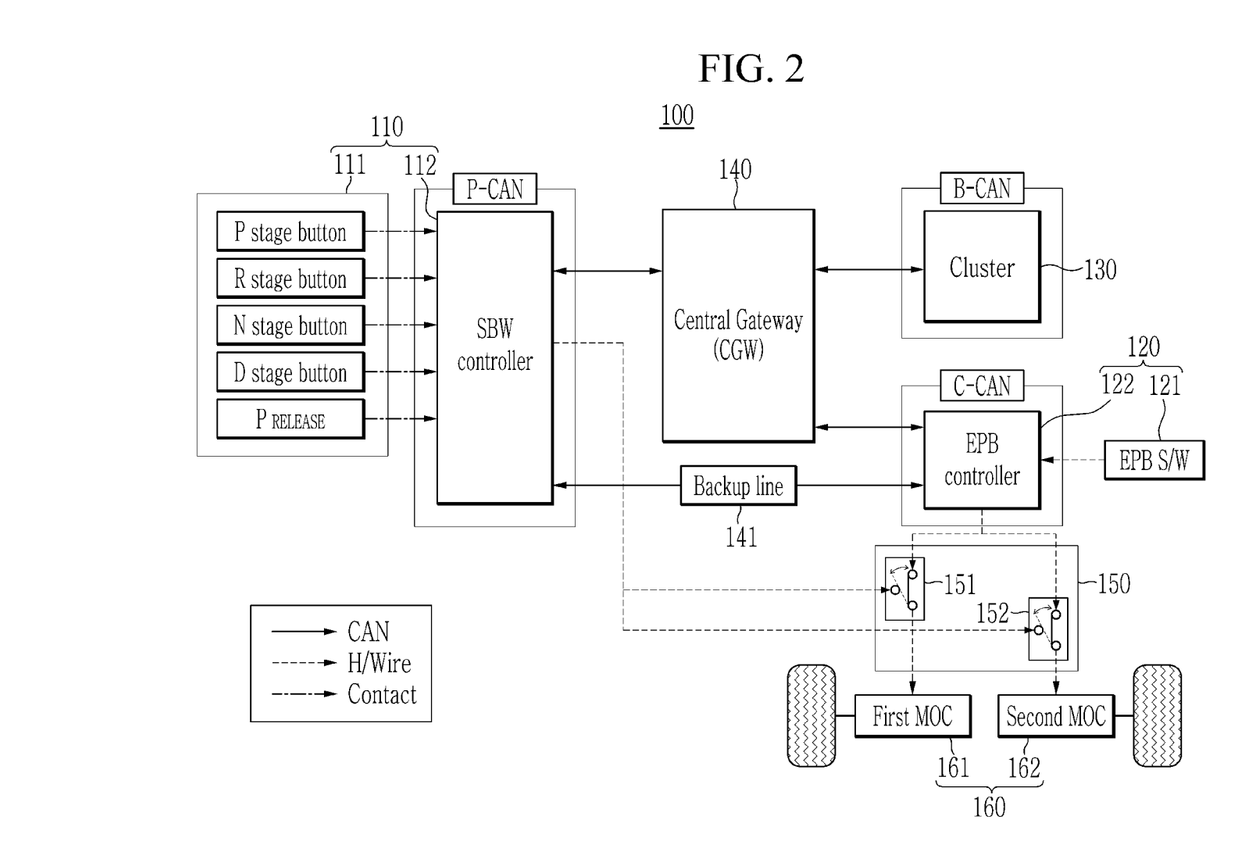
FIG. 2 is a block diagram showing a configuration of the system for parking control of the vehicle according to an exemplary embodiment of the present invention.

A configuration of the system of the vehicle will be described in detail with reference to FIG. 2. FIG. 2 is a block diagram showing a configuration of the system for parking control of the vehicle according to an exemplary embodiment of the present invention. Referring to FIG. 2, the system 100 may include the SBW device 110, the EPB 120, a cluster 130, a central gateway (CGW) 140, a relay 150, and a brake 160.

The SBW device 110 may include a control system 111 configured to electronically input a shift stage (e.g., a gear shift stage) of the P stage, the R stage, the N stage, the D stage, or a PRELEASE stage (i.e., a neutral parking stage), and a SBW controller 112 configured to perform a shift control based on the shift stage. The control system 111 may include any one of a button type control system, a lever type control system, a seesaw type control system, a combination of the button type control system and the seesaw type control system, and a combination of the button type control system and the lever type control system. Hereinafter, the control system 111 having the button type control system will be described for convenience.

The SBW controller 112 may be configured to perform a shift control by operating a solenoid or an electric motor in response to an input of the shift stage to the control system 111 to apply or cut off a hydraulic pressure for each shift stage. The SBW controller 112 may be configured to perform parking control and parking release control through cooperative control using the EPB controller 122. In particular, the SBW controller 112 may be configured to request the EPB controller 122 to perform parking control when the P stage is input to the control system 111.

When the shift stage (e.g., the R stage, the N stage, the D stage, or the PRELEASE stage) other than the P stage is received from the control system 111 in the parking control state of the vehicle, the SBW controller 112 may be configured to request the EPB controller to perform parking release control. As described above, the SBW controller 112 may be configured to request the EPB controller 122 to perform cooperative control with respect to the parking control or the parking release control of the vehicle. The EPB controller 122 may then be configured to execute the parking control or the parking release control according to the cooperative control request.

Further, the SBW controller 112 may be configured to receive a failure event from the EPB controller 122 after requesting the cooperative control. In response to receiving the failure event, the SBW controller 112 may connect the relay 150, which is connected to the EPB controller 122 and the brake 160 installed on a drive wheel of the vehicle at an ordinary time (e.g., when a failure is not detected), to the SBW controller to allow the SBW controller to directly execute parking control or parking release control for the brake.

When no response is received from the EPB controller 122 for a predetermined period of time after the SBW controller 112 requests the cooperative control to the EPB controller, the SBW controller 112 may be configured to detect a failure event (e.g., the request failed) and thus, the SBW controller may be configured to directly execute the parking control or the parking release control for the brake using connection switching with respect to the relay 150. Unlike a wire system according to a related art, the EPB 120 may be an electronic parking brake system that is electronically controlled, and includes an EPB switch 121 and the EPB controller 122.

In particular, the EPB switch 121 may input a parking signal under a manual control (e.g., engagement of a parking button) of a driver or a predetermined stop condition of the vehicle. For example, the EPB switch 121 may input the parking signal when driving information satisfies the stop condition. The driving information may include the vehicle speed, whether an engine of the vehicle is rotated, and whether the brake 160 is operated. The EPB switch 121 may input a parking release signal in an acceleration condition in which an accelerator pedal of the vehicle is operated or engaged.

When the parking signal of the EPB switch 121 is input, the EPB controller 122 may be configured to operate the brake 160 installed on the drive wheel using the relay 150 to adjust the vehicle to be in a parking brake state. When the parking release signal of the EPB switch 121 is input, the EPB controller 122 may be configured to operate the brake 160 via the relay 150 to release the parking brake state. The cooperative control of the EPB controller 122 and the SBW controller 112 will be described below.

When the EPB controller 122 receives parking control request from the SBW controller 112, the EPB controller 122 may be configured to operate the brake 160 via the relay 150 to set the brake in the parking brake state. Thereafter, when the EPB controller 122 receives parking release request from the SBW controller 112, the EPB controller 122 may be configured to operate the brake 160 via the relay 150 to release the brake to be in the parking brake state.

When the EPB controller 122 fails to perform the parking control or parking release control according to the cooperative control request of the SBW controller 112, the EPB controller may be configured to transmit a cooperative control failure event (e.g., a failure detection notification) to the SBW controller. In other words, the cooperative control failure event may be a message in which the EPB controller 122 does not respond to the cooperative control request of the SBW controller 112 to request emergency control to the SBW controller. The EPB controller 122 may then be configured to directly transmit the cooperative control failure event to the SBW controller 112 via a backup line 141 provided separately. In particular, the EPB controller 122 may be configured to identify and display the cause of the failure event via self-diagnosis.

Furthermore, the cluster 130 may be configured to display information related to a shift operation of the system 100 to provide the information to the driver. For example, the cluster 130 may be configured to visually display shift stage information based on any one of the D stage, the R stage, the N stage, and the P stage of the SBW device 110. The cluster 130 may also be configured to display event information, which the EPB controller 122 receives after performing the self-diagnose with respect to the cooperative control failure event, to the driver. The CGW 140 may interconnect the SBW device 110, the EPB 120, and the cluster 130 using different heterogeneous communication protocols to enable a controller area network (CAN) communication among the SBW device, the EPB, and the cluster.

The system 100 may include the backup line 141 for secure communication to enable cooperative control between the SBW device 110 and the EPB 120. The backup line 141 may connect communication between the SBW device 110 and the EPB 120 when an event (e.g., a failure event) occurs. The backup line 141 may be a duplicated line provided to perform safe parking control even when a communication failure of the CGW 140 occurs, to ensure that the SBW device 110 and the EPB 120 are capable of performing secure communication.

Additionally, the relay 150 may include a first relay 151 and a second relay 152 for selectively connecting the EPB 120 and the SBW device 110 to the brake 160 during the parking control of the vehicle. The relay 150 may connect the EPB controller 122 to the brake 160 to transmit a parking control command to the brake when a failure event is not detected (e.g., during a normal operation). The relay 150 may connect the SBW controller 112 to the brake 160 when an event in which a normal operation of the EPB 120 is not performed occurs (e.g., a failure occurs). In other words, the relay 150 may transmit the parking signal and the parking release signal based on the control command of the EPB 120 to the brake 160 at a normal time (e.g., when no failure is detected), and may transmit the parking signal and the parking release signal of the SBW controller 112 to the brake in an emergency.

The brake 160 may include a first motor on caliper (MOC) 161 and a second MOC 162 mounted on both drive wheels of the vehicle and correspondingly connected to the first relay 151 and the second relay 152. The motor on caliper (MOC) may be referred to a motor on caliper (MOC) system or a motor on caliper (MOC) device. The first MOC 161 and the second MOC 162 may be mounted on both sides of the rear wheels, but not limited thereto, and may be mounted on front wheels of the vehicle depending on the vehicle type.

Each of the first and second MOCs 161 and 162 may be configured to convert rotational force of a motor into a translational motion via a screw during the parking control so that both pads apply pressure to the brake disc to generate braking force. Each of the first and second MOCs 161 and 162 may also be configured to release the brake disc pressure via the motor control opposite to the motor control in the above parking control.

Figure 3:
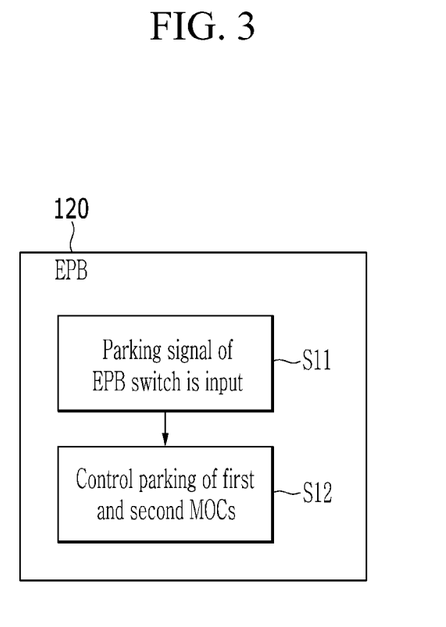
FIG. 3 and FIG. 4 are flowcharts illustrating methods for parking control and parking release control of an electronic parking brake (EPB) according to an exemplary embodiment of the present invention.
Figure 4:
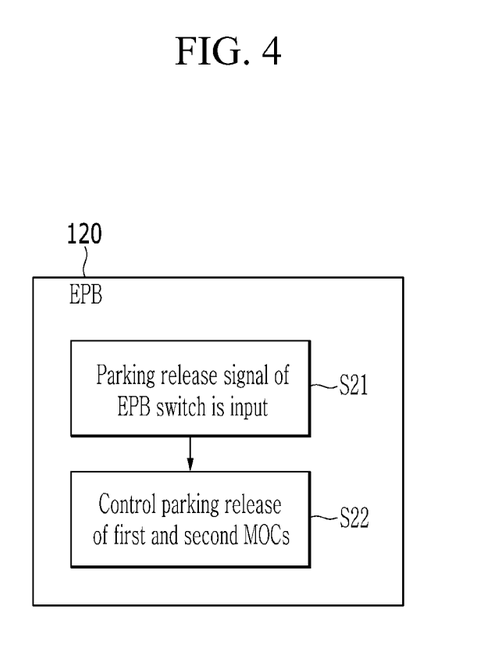

An electronic transmission control method according to an exemplary embodiment of the present invention will be described with reference to FIGS. 3 to 5 based on a configuration of the electronic transmission control system. The methods described herein below may be executed by a controller having a processor and a memory. FIG. 3 and FIG. 4 are flowcharts illustrating methods for parking control and parking release control of the EPB according to an exemplary embodiment of the present invention.

Referring to FIG. 3, when the parking signal is input to the EPB switch 121 by the driver (step S11), the EPB 120 may be configured to execute parking of the first MOC 161 and the second MOC 162 mounted on the rear wheels (step S12). The EPB 120 may be configured to transmit the parking signal to the first MOC 161 and the second MOC 162 through the first relay 151 and the second relay 152, which are connected at an ordinary time.

Referring to FIG. 4, when the parking release signal is input to the EPB switch 121 by the driver in a state that parking brake of the vehicle is operated (step S21), the EPB 120 may be configured to execute a parking release of the first MOC 161 and the second MOC 162 mounted on the rear wheels (step S22). The EPB 120 may then be configured to transmit the parking release signal to the first MOC 161 and the second MOC 162 through the first relay 151 and the second relay 152 which are connected at an ordinary time.

Figure 5:
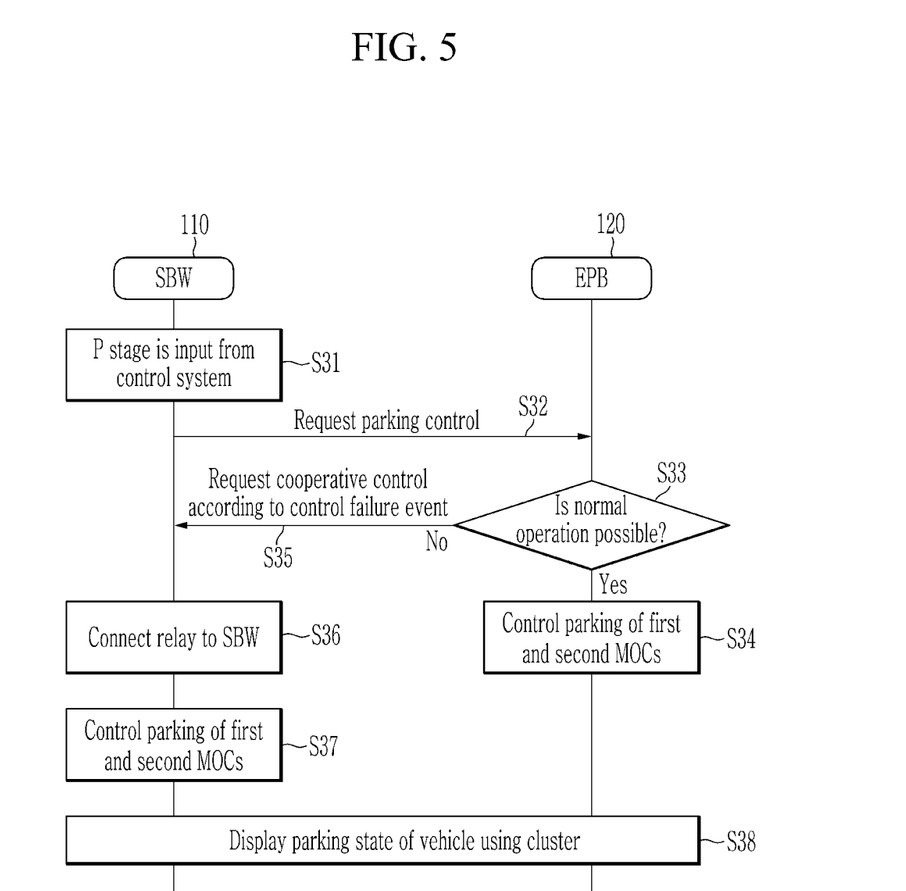
FIG. 5 is a flowchart illustrating a method for parking control of a vehicle according to an exemplary embodiment of the present invention.

FIG. 5 is a flowchart illustrating a method for parking control of the vehicle according to an exemplary embodiment of the present invention. Referring to FIG. 5, a method is shown for parking control of the vehicle according to the cooperative control between the SBW device 110 and the EPB 120 of the system 100.

Particularly, when the P stage is input from the control system 111 (step S31), the SBW device 110 may be configured to request parking control to the EPB 120 (step S32). When The EPB 120 detects or confirms monitoring information of the EPB controller 122 according to the parking control request and determines that a normal operation of the EPB or the EPB controller is possible (step S33), that is, no failure is detected, the EPB 120 may be configured to execute parking of the first MOC 161 and the second MOC 162 via the relay 150 which is connected at an ordinary time (step S34).

Further, the EPB 120 may be configured to transmit a parking state of the vehicle to the cluster 130 and the cluster may be configured to display the parking state (step S38). In response to determining in the step S33 that the monitoring information of the EPB controller 122 with respect to the parking control request indicates that the normal operation of the EPB is impossible (e.g., detects a failure based on a connection error), the EPB 120 may be configured to request cooperative control due to the cooperative control failure event to the SBW device 110 (step S35). When a voltage difference of the relay 150 for driving the first MOC 161 and the second MOC 162 that the EPB controller 122 monitors via self-diagnosis exceeds a predetermined range, the EPB 120 may be configured to determine that the normal operation of the EPB is impossible or detect the error/failure state.

Additionally, the EPB 120 may be configured to determine a state in which the first MOC 161 and the second MOC 162 are not controlled for various reasons such as a failure of the EPB controller 122, a connection error of the relay 150, or a disconnection of the relay. When the SBW device 110 receives the failure event from the EPB 120, the SBW device 110 may connect the relay 150 to the SBW device (step S36), and may be configured to execute parking of the first MOC 161 and the second MOC 161 mounted on the rear wheels through the connected relay 150 (step S37).

The SBW device 110 may be configured to transmit a parking state of the vehicle to the cluster 130 and the cluster may be configured to display the parking state (step S38). The SBW device 110 may be configured to operate the cluster 130 to display state information of the EPB controller 122 according to the failure event to provide a notification to the driver of the state information. Thereafter, a state in which the relay 150 is switched to the SBW device 110 may continue until the EPB 120 is normally operated (e.g., until the failure state is repaired).

Figure 6:
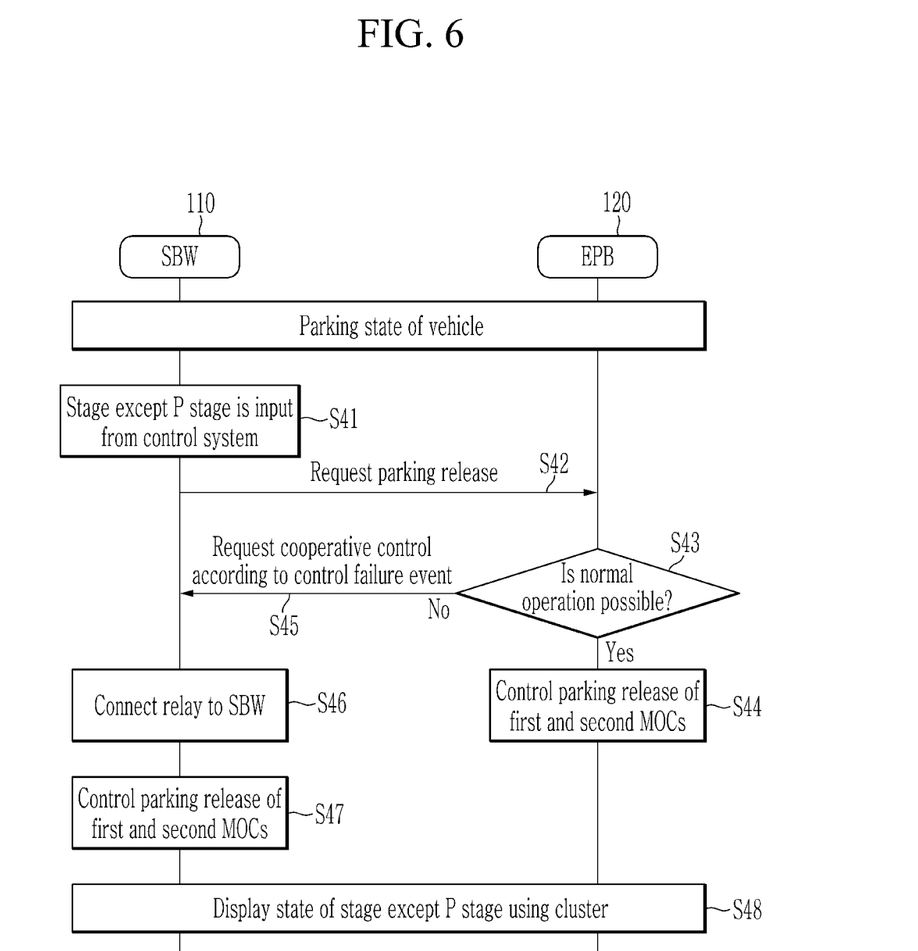
FIG. 6 is a flowchart illustrating a method for parking release control of a vehicle according to an exemplary embodiment of the present invention.

FIG. 6 is a flowchart illustrating a method for parking release control of the vehicle according to an exemplary embodiment of the present invention. Referring to FIG. 6, a parking release method according to cooperative control is described assuming that the vehicle is ordinarily parked by the EPB 120.

When the shift stage (e.g., the R stage, the N stage, or the D stage) other than the P stage is input from the control system 111 in the parked state of the vehicle (step S41), The SBW device 110 may be configured to request parking release to the EPB 120 (step S42). When The EPB 120 detects or confirms monitoring information of the EPB controller 122 according to the parking release request and determines that a normal operation of the EPB or the EPB controller is possible (step S43), the EPB 120 may be configured to execute a parking release of the first MOC 161 and the second MOC 162 via the relay 150 which is connected at an ordinary time (step S44).

Further, the EPB 120 may be configured to transmit a state of the shift stage other than the P stage to the cluster 130 and the cluster may be configured to display the state (step S48). In response to determining in the step S43 that the monitoring information of the EPB controller 122 with respect to the parking release request indicates that the normal operation of the EPB is impossible, the EPB 120 may be configured to request cooperative control due to the cooperative control failure event to the SBW device 110 (step S45).

When the SBW device 110 receives the failure event from the EPB 120, the SBW device 110 may connect the relay 150 to the SBW device (step S46), and may be configured to execute a parking release of the first MOC 161 and the second MOC 161 mounted on the rear wheels through the connected relay 150 (step S47). Then, the SBW device 110 may be configured to transmit the state of the shift stage other than the P stage of the vehicle to the cluster 130 and the cluster may be configured to display the state (step S48). The SBW device 110 may be configured to operate the cluster 130 to display state information of the EPB controller 122 according to the failure event to inform the driver of the state information.

Figure 7:
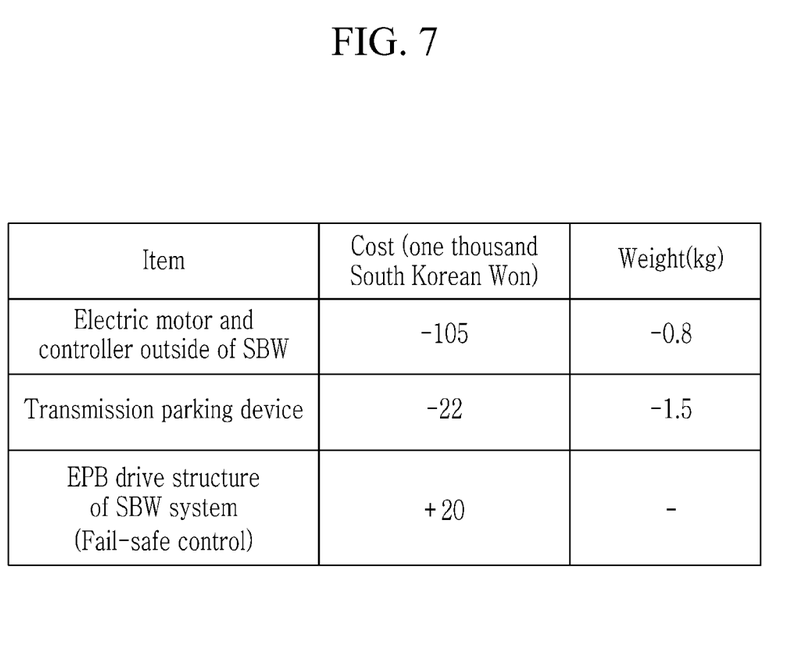
FIG. 7 shows a table illustrating an effect of the system for parking control of the vehicle according to an exemplary embodiment of the present invention.

FIG. 7 shows a table illustrating an effect of the system for parking control of the vehicle according to an exemplary embodiment of the present invention. Referring to FIG. 7, the electronic transmission control system may perform safe transmission parking control via cooperative control of the electronic transmission (SBW) and the electronic parking brake (EPB).

The exemplary embodiment may reduce manufacturing cost and a weight of the vehicle by omitting the transmission parking configuration. The exemplary embodiments of the present invention have been described, but the scope of the present invention is not limited thereto and may be variously modified.

In the exemplary embodiment of the present invention shown in FIGS. 5 and 6, the parking and parking release method by cooperative control of the SBW device 110 and the EPB 120 according to the input of the P stage and the input of the shift stage other than the P to the control system 111 has been described. However, the exemplary embodiment of the present invention is not limited thereto, and a method similar to the parking and parking release method shown in FIGS. 5 and 6 may be applied to the parking and parking release control according to the input of the EPB switch 121 of the EPB 120 shown in FIG. 3 and FIG. 4.

For example, the EPB 120 may be configured to request cooperative control due to a cooperative control failure event to the SBW device 110 when a normal operation of the EPB controller 122 is impossible after the signal is input to the EPB switch 121 by the driver. At this time, the SBW device 110 may be configured to perform cooperative control in response to the input signal of the EPB switch 121 by forcibly connecting the relay 150 to the SBW device and execute parking or parking release of the first MOC 161 and the second MOC 162.

The exemplary embodiment of the present invention is not implemented by the aforementioned apparatus and/or method, and may be implemented by a program for operating a function corresponding to the configuration of the exemplary embodiment of the present invention, a recording medium in which the program is recorded, and the like, and the implementation may be easily realized from the description of the aforementioned exemplary embodiment by those skilled in the art.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: parking control system
110: electronic transmission

111: control system
112: SBW controller
120: EPB
121: EPB switch
122: EPB controller
130: cluster
140: CGW
141: backup line
150: relay
151: first relay
152: second relay
160: MOC
161: first MOC
162: second MOC

What is claimed is:

1. A system for parking control of a vehicle in which a transmission parking configuration is omitted, comprising:
a shift by wire device configured to request a parking control of the vehicle when a parking stage is input by an operation of a driver of the vehicle; and
an electronic parking brake configured to operate a brake installed on a drive wheel via a relay which is connected to operate the brake to be in a parking brake state when the electronic parking brake receives the parking control request from the shift by wire device,
wherein the electronic parking brake is configured to confirm monitoring information of the electronic parking brake according to the input signal of the electronic parking brake switch to determine whether a failure event occurs, and to transmit the failure event to a shift by wire device to request cooperative control, and
wherein the shift by wire device is configured to switch the relay to directly operate the brake to be in the parking brake state when the shift by wire device receives the failure event from the electronic parking brake.

2. The system of claim 1, further comprising:
a cluster configured to display information regarding a shift operation of the shift by wire device to the driver;
a central gateway that interconnects the shift by wire device, the electronic parking brake, and the cluster that communicate heterogeneous network; and
a backup line that connects a communication between the shift by wire device and the electronic parking brake when the failure event occurs.

3. The system of claim 1, wherein the shift by wire device includes:
a control system configured to electronically input a shift stage of a parking stage, a reverse stage, a neutral stage, a drive stage, or a neutral parking stage; and
a shift by wire controller configured to perform a shift control based on the shift stage.

4. The system of claim 3, wherein the electronic parking brake includes:
an electronic parking brake switch configured to input a parking signal under a manual control of the driver or a predetermined stop condition of the vehicle; and
an electronic parking brake controller configured to operate the brake using the relay to adjust the brake to be in the parking brake state when the parking signal is input.

5. The system of claim 4, wherein the shift by wire controller is configured to request the electronic parking brake controller to perform a parking release control when any one of the reverse stage, the neutral stage, the drive stage, and the neutral parking other than the parking stage is received from the control system in the parking control state of the vehicle.

6. The system of claim 4, wherein the electronic parking brake controller is configured to transmit the failure event to the shift by wire controller when the electronic parking brake controller fails to perform the parking control or the parking release control based on a cooperative control request of the shift by wire controller.

7. The system of claim 4, wherein the electronic parking brake controller is configured to detect the failure event when a voltage difference of the relay driving the brake, which the electronic parking brake controller monitors via self-diagnosis, exceeds a predetermined range.

8. The system of claim 1, wherein the relay transmits a parking control command of the electronic parking brake to the brake at a normal time, and transmits a parking control command of the shift by wire device to the brake in an emergency related to the failure event.

9. The system of claim 1, wherein the relay includes a first relay and a second relay that selectively connect the electronic parking brake and the shift by wire device to the brake during the parking control of the vehicle.

10. A method for parking control of a vehicle in which a transmission parking configuration is omitted, comprising:
requesting, by a shift by wire device, a parking control of the vehicle to an electronic parking brake when a parking stage is input by an operation of a driver of the vehicle;
confirming, by the electronic parking brake, monitoring information of the electronic parking brake based on the parking control request to detect a failure event;
transmitting, by the electronic parking brake, the failure event to a shift by wire device to request cooperative control; and
switching, by the shift by wire device, a relay that is connected to directly operate a brake installed on a drive wheel to be in a parking brake state when the shift by wire device receives the failure event from the electronic parking brake.

11. The method of claim 10, wherein the switching includes:
operating, by the electronic parking brake, the brake via the relay to be in the parking brake state when the electronic parking brake detects a normal operation.

12. The method of claim 10, wherein the switching includes:
operating, by the shift by wire device, a first motor on caliper and a second motor on caliper mounted on both drive wheels of the vehicle to be in the parking brake state via a first relay and a second relay that are switched to the shift by wire device when the failure event is detected.

13. The method of claim 10, wherein confirming the monitoring information includes:
detecting, by an electronic parking brake controller of the electronic parking brake, the failure event when a voltage difference of the relay driving the brake, which the electronic parking brake controller monitors via self-diagnosis, exceeds a predetermined range.

14. The method of claim 10, further comprising:
requesting, by the shift by wire device, parking release to the electronic parking brake when a shift stage except the parking stage is input by an operation of the driver;
confirming, by the electronic parking brake, monitoring information of the electronic parking brake according to the parking release request to determine whether the failure event occurs;

operating, by the electronic parking brake, the brake via the relay to be in a parking brake release state when the electronic parking brake detects the normal operation; and switching, by the shift by wire device, the relay to directly operate the brake to be in the parking brake release state when the shift by wire device receives a failure event from the electronic parking brake.

15. The method of claim 10, wherein the switching includes:

receiving, by the shift by wire device, the failure event from the electronic parking brake via a duplicated backup line.

16. A method for parking control of a vehicle in which a transmission parking configuration is omitted, comprising:

receiving, by an electronic parking brake, a signal of an electronic parking brake switch of the electronic parking brake input by a driver of the vehicle;

confirming, by the electronic parking brake, monitoring information of the electronic parking brake according to the input signal of the electronic parking brake switch to determine whether a failure event occurs;

transmitting, by the electronic parking brake, the failure event to a shift by wire device to request cooperative control; and switching, by the shift by wire device, a relay that is connected to directly operate a brake installed on a drive wheel to be in a parking brake state when the shift by wire device receives the failure event from the electronic parking brake.

* * * * *